US012681501B2

(12) United States Patent
Yu

(10) Patent No.: US 12,681,501 B2
(45) Date of Patent: Jul. 14, 2026

(54) OUTBOUND METHOD AND DEVICE

(71) Applicant: SHENZHEN KUBO SOFTWARE CO., LTD, Shenzhen (CN)

(72) Inventor: Runfang Yu, Shenzhen (CN)

(73) Assignee: SHENZHEN KUBO SOFTWARE CO., LTD, Shenzhen (CN)

( * ) Notice: Subject to any disclaimer, the term of this patent is extended or adjusted under 35 U.S.C. 154(b) by 76 days.

(21) Appl. No.: 18/584,390

(22) Filed: Feb. 22, 2024

(65) Prior Publication Data

US 2024/0201704 A1      Jun. 20, 2024

Related U.S. Application Data

(63) Continuation of application No. PCT/CN2022/115972, filed on Aug. 30, 2022.

(30) Foreign Application Priority Data

Sep. 10, 2021      (CN) ........................... 202111063114.7

(51) Int. Cl.
  *G05D 1/648*           (2024.01)
  *B65G 1/137*           (2006.01)
      (Continued)

(52) U.S. Cl.
  CPC ........... *G05D 1/648* (2024.01); *B65G 1/1373* (2013.01); *G05D 2105/20* (2024.01); *G05D 2107/70* (2024.01)

(58) Field of Classification Search
  CPC ............... G05D 1/648; G05D 2105/20; G05D 2107/70; B65G 1/1373; B65G 1/1378;
      (Continued)

(56) References Cited

U.S. PATENT DOCUMENTS

| | | | | |
|---|---|---|---|---|
| 5,430,831 A | * | 7/1995 | Snellen | ................. G06Q 10/043 |
| 6,011,998 A | * | 1/2000 | Lichti | .................. B65G 1/1376 |

(Continued)

FOREIGN PATENT DOCUMENTS

| | | |
|---|---|---|
| CN | 105427065 A | 3/2016 |
| CN | 109767151 A | 5/2019 |

(Continued)

OTHER PUBLICATIONS

Machine Translation of CN-110286673-A, Storage Task Processing Method, Device, Storage System, and Storage Medium (Year: 2019).*

(Continued)

*Primary Examiner* — Ellis B. Ramirez

(74) *Attorney, Agent, or Firm* — Ladas & Parry, LLP

(57)      ABSTRACT

This application provides an outbound method and a device, and relates to the field of goods transporting device technologies. The method may include: determining at least one outbound sequence, where the outbound sequence includes at least one outbound group, and the outbound group includes at least one outbound container; assigning a transporting task of the outbound container to a robot according to the at least one outbound sequence; and carrying out an outbound operation of the at least one outbound container according to a task execution state of the transporting task and the at least one outbound sequence.

15 Claims, 3 Drawing Sheets determining at least one outbound sequence, where each outbound sequence includes at least one outbound group, and each outbound group includes at least one outbound tote

S201 assigning a handling task of the outbound tote to a robot according to the at least one outbound sequence

S202 carrying out the outbound operation of the at least one outbound tote according to a task execution state of the handling task and the at least one outbound sequence

S203

(51) Int. Cl.
   *G05D 105/20*     (2024.01)
   *G05D 107/70*     (2024.01)
(58) Field of Classification Search
   CPC ......... B65G 2201/0235; G06Q 10/083; G06Q
          10/08; G05B 2219/45047; B07C 3/008
   USPC ........ 700/245, 214, 228, 230; 414/279, 282,
          414/283, 615; 901/1; 705/7.21, 330
   See application file for complete search history.

(56)                References Cited

U.S. PATENT DOCUMENTS

| | | | |
|---|---|---|---|
| 8,494,673 B2 * | 7/2013 | Miranda .............. | B65G 1/1378 |
| 10,676,279 B1 * | 6/2020 | Bidram .................. | A01G 9/143 |
| 2011/0170998 A1 * | 7/2011 | Winkler ............... | B65G 47/904 |
| 2014/0214195 A1 * | 7/2014 | Worsley ............... | G05D 1/0287 |
| 2018/0022551 A1 * | 1/2018 | Gondoh ............ | G06Q 10/0832 |
| 2019/0389671 A1 * | 12/2019 | Cohen .................... | B65G 47/71 |
| 2020/0223066 A1 * | 7/2020 | Diankov ............... | B25J 9/1664 |
| 2020/0302391 A1 * | 9/2020 | Li ....................... | G06Q 10/0875 |
| 2021/0284446 A1 * | 9/2021 | Cairl ...................... | B65G 1/065 |
| 2022/0019214 A1 * | 1/2022 | Solanki .................. | B65G 43/08 |
| 2023/0002161 A1 * | 1/2023 | Bauman .................. | B07C 3/008 |

FOREIGN PATENT DOCUMENTS

| | | | | |
|---|---|---|---|---|
| CN | 110286673 | A | 9/2019 | |
| CN | 110533350 | A | 12/2019 | |
| CN | 110705946 | A | 1/2020 | |
| CN | 112239043 | A | 1/2021 | |
| CN | 112862394 | A | 5/2021 | |
| CN | 213140441 | U | 5/2021 | |
| CN | 113269494 | A | 8/2021 | |
| CN | 113283838 | A | 8/2021 | |
| JP | H03190215 | A | 8/1991 | |
| JP | H0581303 | A | 4/1993 | |
| JP | H07309404 | A | 11/1995 | |
| JP | 2002284310 | A | 10/2002 | |
| JP | 3468118 | B2 * | 11/2003 | |
| JP | 2010280475 | A | 12/2010 | |
| JP | 2018100160 | A | 6/2018 | |
| JP | 6765741 | B1 * | 10/2020 | ............. B25J 15/00 |

OTHER PUBLICATIONS

Machine Translation of CN-110286673-A (Year: 2019).*
Machine Translation of CN-113269494-A (Year: 2021).*
The International Search Report mailed Nov. 23, 2022 PCT/CN2022/115972 with English Translation.
The First Chinese Office Action dated Sep. 3, 2024; Appln. 202111063114.7.
The Japanese Notice of Reasons for Refusal; dated Oct. 21, 2024; Appln. No. 2024-513386.
The Extended European Search Report dated Dec. 3, 2024; Appln. No. 22866487.6.

* cited by examiner

101

102

104

103

105

102

103

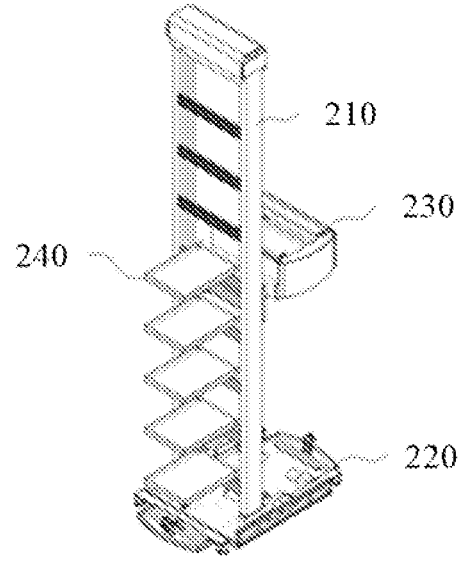

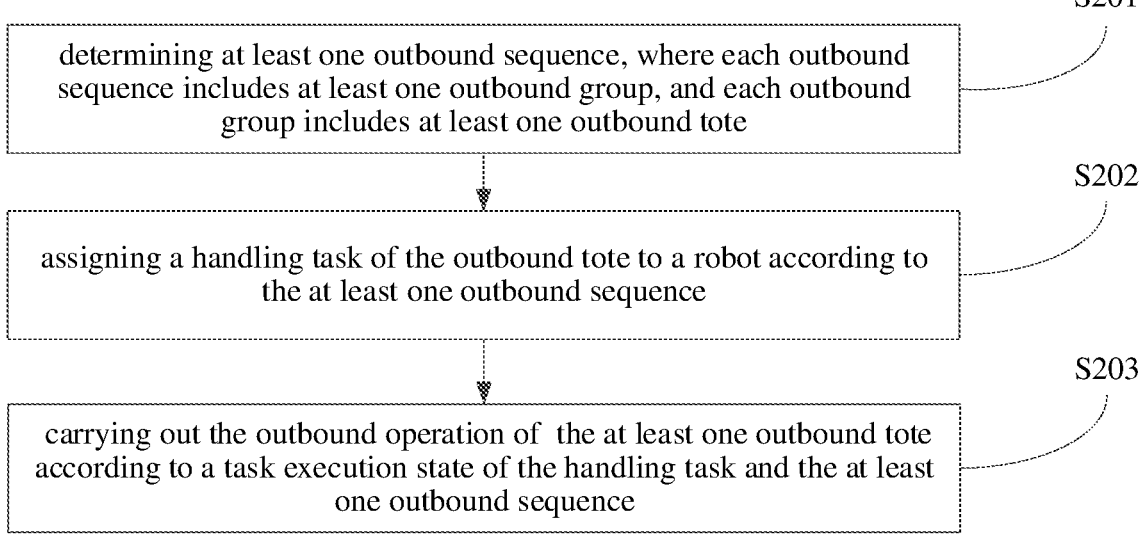

S201 determining at least one outbound sequence, where each outbound
sequence includes at least one outbound group, and each outbound
group includes at least one outbound tote

S202 assigning a handling task of the outbound tote to a robot according to
the at least one outbound sequence

S203 carrying out the outbound operation of the at least one outbound tote
according to a task execution state of the handling task and the at least
one outbound sequence

FIG. 4

OUTBOUND METHOD AND DEVICE

CROSS-REFERENCES

This application is a continuation of International Patent Application No. PCT/CN2022/115972 filed on Aug. 30, 2022, which claims priority to Chinese Patent Application No. 202111063114.7 filed on Sep. 10, 2021, both of which are incorporated herein by reference in their entireties.

TECHNICAL FIELD

Embodiments of this application relate to the field of goods transporting device technologies, and in particular, to an outbound method and a device.

BACKGROUND OF THE INVENTION

Intelligent warehousing is an important part of a logistics process. Robots can replace manual labor in transporting containers and play an important role in intelligent warehousing. A robot can perform a retrieving and placing process on a container, including: picking the container from a rack and placing the container onto the rack. The picking the container from the rack can be referred to as outbound, and the placing the container onto the rack can be referred to as inbound.

As a service scenario is gradually complicated, how to satisfy an outbound requirement in the complicated service scenario is a problem to be resolved urgently.

SUMMARY OF THE INVENTION

Embodiments of this application provide an outbound method and a device, to satisfy an outbound requirement in a complicated service scenario.

According to a first aspect, an embodiment of this application provides an outbound method, including: determining at least one outbound sequence, where each outbound sequence includes at least one outbound group, and each outbound group includes at least one outbound container; assigning a transporting task of the outbound container to a robot according to the at least one outbound sequence; and carrying out the outbound operation of the at least one outbound container according to a task execution state of the transporting task and the at least one outbound sequence.

Optionally, when at least two outbound sequences exist, the assigning the transporting task of the outbound container to the robot according to the at least one outbound sequence includes: assigning transporting tasks of the at least two outbound sequences to the robot in parallel, and assigning, according to a target outbound strategy corresponding to each outbound sequence, a transporting task of at least one outbound container in each outbound sequence to the robot, where the target outbound strategy is used for indicating a first outbound order of the at least one outbound group included in the outbound sequence, and/or a second outbound order of the at least one outbound container included in each outbound group.

Optionally, the assigning, according to the target outbound strategy corresponding to each outbound sequence, the transporting task of the at least one outbound container in each outbound sequence to the robot includes: assigning, according to the first outbound order and the second outbound order, the transporting task of the at least one outbound container in the outbound sequence to the robot; or assigning, according to the first outbound order and an intra-group default strategy, the transporting task of the at least one outbound container in the outbound sequence to the robot, where the intra-group default strategy is used for determining, according to information about each outbound container included in the outbound group, an outbound order of the at least one outbound container; or assigning, according to an inter-group default strategy and the second outbound order, the transporting task of the at least one outbound container in the outbound sequence to the robot, where the inter-group default strategy is used for determining, according to information about each outbound group included in the outbound sequence, an outbound order of the at least one outbound group; or assigning, according to the inter-group default strategy and the intra-group default strategy, the transporting task of the at least one outbound container in the outbound sequence to the robot.

Optionally, the information about the outbound group includes at least one of the following: the number of the outbound containers included in the outbound groups, and the number of aisles in which the outbound containers included in the outbound groups are located.

Optionally, the information about the outbound container includes at least one of the following: a transporting distance of the outbound container, a weight of the outbound container, and a size of the outbound container.

Optionally, the assigning, according to the first outbound order and the second outbound order, the transporting task of the at least one outbound container in the outbound sequence to the robot includes: in a process of assigning, according to the first outbound order and the second outbound order, the transporting task of each outbound container in the outbound sequence to the robot, if a transporting task of any outbound container in the outbound sequence is assigned unsuccessfully, stopping assigning the transporting task of each outbound container in the outbound sequence to the robot.

Optionally, the assigning, according to the inter-group default strategy and the second outbound order, the transporting task of the at least one outbound container in the outbound sequence to the robot includes: in a process of assigning the transporting task of each outbound container in the outbound sequence to the robot, if a transporting task of a first outbound container in the outbound sequence is assigned unsuccessfully, stopping assigning transporting tasks of other outbound containers in a first outbound group in which the first outbound container is located to the robot, and assigning a transporting task of each outbound container in a second outbound group to the robot, where the second outbound group is an outbound group in the outbound sequence other than the first outbound group.

Optionally, the assigning, according to the first outbound order and the intra-group default strategy, the transporting task of the at least one outbound container in the outbound sequence to the robot includes: in a process of assigning the transporting task of each outbound container in the outbound sequence to the robot, if a transporting task of a first outbound container in the outbound sequence is assigned unsuccessfully, stopping assigning a transporting task of an outbound container in an outbound group other than a first outbound group to the robot, and assigning a transporting task of an outbound container in the first outbound group other than the first outbound container to the robot, where the first outbound group is an outbound group in which the first outbound container is located.

Optionally, the outbound the at least one outbound container according to the task execution state of the transporting task and the at least one outbound sequence includes: when a task execution state of a second transporting task corresponding to one second outbound container is that the second outbound container is picked out, obtaining a task execution state of at least one third transporting task, where the third transporting task is a transporting task of a third outbound container, the third outbound container includes an outbound container that is in the first outbound order and that is included in a third outbound group located before a second outbound group and/or an outbound container that is in the second outbound order corresponding to the second outbound group and that is located before the second outbound container, and the second outbound group is an outbound group in which the second outbound container is located; and if the task execution state of each third transporting task is that a work table is reached, continuing to execute the second transporting task, to bound out the second outbound container and the third outbound container according to the first outbound order and/or the second outbound order.

Optionally, the method further includes: if the task execution state of the at least one third transporting task is any execution state before that the work table is reached, controlling the robot transporting the second outbound container to wait; and when the task execution state of the third transporting task is updated to that the work table is reached, continuing to execute the second transporting task, to bound out the second outbound container and the third outbound container according to the first outbound order and/or the second outbound order.

According to a second aspect, an embodiment of this application provides an outbound apparatus, including: an outbound sequence determining module, configured to determine at least one outbound sequence, where each outbound sequence includes at least one outbound group, and each outbound group includes at least one outbound container; a task assignment module, configured to assign a transporting task of the outbound container to a robot according to the at least one outbound sequence; and a container outbound module, configured to carry out the outbound operation of the at least one outbound container according to a task execution state of the transporting task and the at least one outbound sequence.

Optionally, when at least two outbound sequences exist, the task assignment module is further configured to: assign transporting tasks of the at least two outbound sequences to the robot in parallel, and assign, according to a target outbound strategy corresponding to each outbound sequence, a transporting task of at least one outbound container in each outbound sequence to the robot, where the target outbound strategy is used for indicating a first outbound order of the at least one outbound group included in the outbound sequence, and/or a second outbound order of the at least one outbound container included in each outbound group.

Optionally, the task assignment module is further configured to: when assigning, according to the target outbound strategy corresponding to each outbound sequence, the transporting task of the at least one outbound container in each outbound sequence to the robot, assign, according to the first outbound order and the second outbound order, the transporting task of the at least one outbound container in the outbound sequence to the robot; or assign, according to the first outbound order and an intra-group default strategy, the transporting task of the at least one outbound container in the outbound sequence to the robot, where the intra-group default strategy is used for determining, according to information about each outbound container included in the outbound group, an outbound order of the at least one outbound container; or assign, according to an inter-group default strategy and the second outbound order, the transporting task of the at least one outbound container in the outbound sequence to the robot, where the inter-group default strategy is used for determining, according to information about each outbound group included in the outbound sequence, an outbound order of the at least one outbound group; or assign, according to the inter-group default strategy and the intra-group default strategy, the transporting task of the at least one outbound container in the outbound sequence to the robot.

Optionally, the information about the outbound group includes at least one of the following: the number of the outbound containers included in the outbound groups, and the number of aisles in which the outbound containers included in the outbound groups are located.

Optionally, the information about the outbound container includes at least one of the following: a transporting distance of the outbound container, a weight of the outbound container, and a size of the outbound container.

Optionally, the task assignment module is further configured to: when assigning, according to the first outbound order and the second outbound order, the transporting task of the at least one outbound container in the outbound sequence to the robot, if a transporting task of any outbound container in the outbound sequence is assigned unsuccessfully, stop assigning the transporting task of each outbound container in the outbound sequence to the robot.

Optionally, the task assignment module is further configured to: when assigning, according to the inter-group default strategy and the second outbound order, the transporting task of the at least one outbound container in the outbound sequence to the robot, if a transporting task of a first outbound container in the outbound sequence is assigned unsuccessfully, stop assigning transporting tasks of other outbound containers in a first outbound group in which the first outbound container is located to the robot, and assign a transporting task of each outbound container in a second outbound group to the robot, where the second outbound group is an outbound group in the outbound sequence other than the first outbound group.

Optionally, the task assignment module is further configured to: when assigning, according to the first outbound order and the intra-group default strategy, the transporting task of the at least one outbound container in the outbound sequence to the robot, if a transporting task of a first outbound container in the outbound sequence is assigned unsuccessfully, stop assigning a transporting task of an outbound container in an outbound group other than a first outbound group to the robot, and assign a transporting task of an outbound container in the first outbound group other than the first outbound container to the robot, where the first outbound group is an outbound group in which the first outbound container is located.

Optionally, the container outbound module is further configured to: when a task execution state of a second transporting task corresponding to one second outbound container is that the second outbound container is picked out, obtain a task execution state of at least one third transporting task, where the third transporting task is a transporting task of a third outbound container, the third outbound container includes an outbound container that is in the first outbound order and that is included in a third outbound group located before a second outbound group and/or an outbound container that is in the second outbound order corresponding to the second outbound group and that is located before the second outbound container, and the second outbound group is an outbound group in which the second outbound container is located; and if the task execution state of each third transporting task is that a work table is reached, continue to execute the second transporting task, to bound out the second outbound container and the third outbound container according to the first outbound order and/or the second outbound order.

Optionally, the container outbound module is further configured to: if the task execution state of the at least one third transporting task is any execution state before that the work table is reached, control the robot transporting the second outbound container to wait; and when the task execution state of the third transporting task is updated to that the work table is reached, continue to execute the second transporting task, to bound out the second outbound container and the third outbound container according to the first outbound order and/or the second outbound order.

According to a third aspect, an embodiment of this application provides an electronic device, including: at least one processor and a memory, where the memory stores computer-executable instructions; and the at least one processor executes the computer-executable instructions stored in the memory, to enable the electronic device to perform the method according to the foregoing first aspect.

According to a fourth aspect, an embodiment of this application provides a computer-readable storage medium, where the computer-readable storage medium stores computer-executable instructions, and when a processor executes the computer-executable instructions, a computing device is enabled to perform the method according to the foregoing first aspect.

According to a fifth aspect, an embodiment of this application provides a computer program, where the computer program is used for performing the method according to the foregoing first aspect.

Based on the outbound method and the device provided in the embodiments of this application, at least one outbound sequence may be determined, where each outbound sequence includes at least one outbound group, and each outbound group includes at least one outbound container; a transporting task of the outbound container is assigned to a robot according to the at least one outbound sequence; and the at least one outbound container is bounded out according to a task execution state of the transporting task and the at least one outbound sequence. Based on the embodiments of this application, an outbound requirement in a complicated service scenario may be divided into an outbound sequence and an outbound group, where each outbound sequence includes at least one outbound group, and each outbound group includes at least one outbound container. Therefore, the outbound container may be bounded out through the outbound sequence and the outbound group, and the outbound requirement in the complicated service scenario may be satisfied.

BRIEF DESCRIPTION OF DRAWINGS

To describe the technical solutions of the embodiments of this application or the existing technology more clearly, the following briefly introduces the accompanying drawings required for describing the embodiments or the existing technology. Apparently, the accompanying drawings in the following description show some embodiments of this application, and a person of ordinary skill in the art may still derive other drawings from these accompanying drawings without creative efforts.

FIG. 3 is a schematic structural diagram of a robot according to this application;

FIG. 4 is a flowchart of specific steps of an outbound method according to an embodiment of this application;

DETAILED DESCRIPTION

In order to make objectives, technical solutions, and advantages of embodiments of this application clearer, the technical solutions in the embodiments of this application will be clearly and completely described above with reference to the accompanying drawings of the embodiments of this application. Apparently, the embodiments to be described are a part rather than all of the embodiments of this application. All other embodiments obtained by a person of ordinary skill in the art based on the embodiments of this application without creative efforts shall fall within the protection scope of this application.

Figure 1:
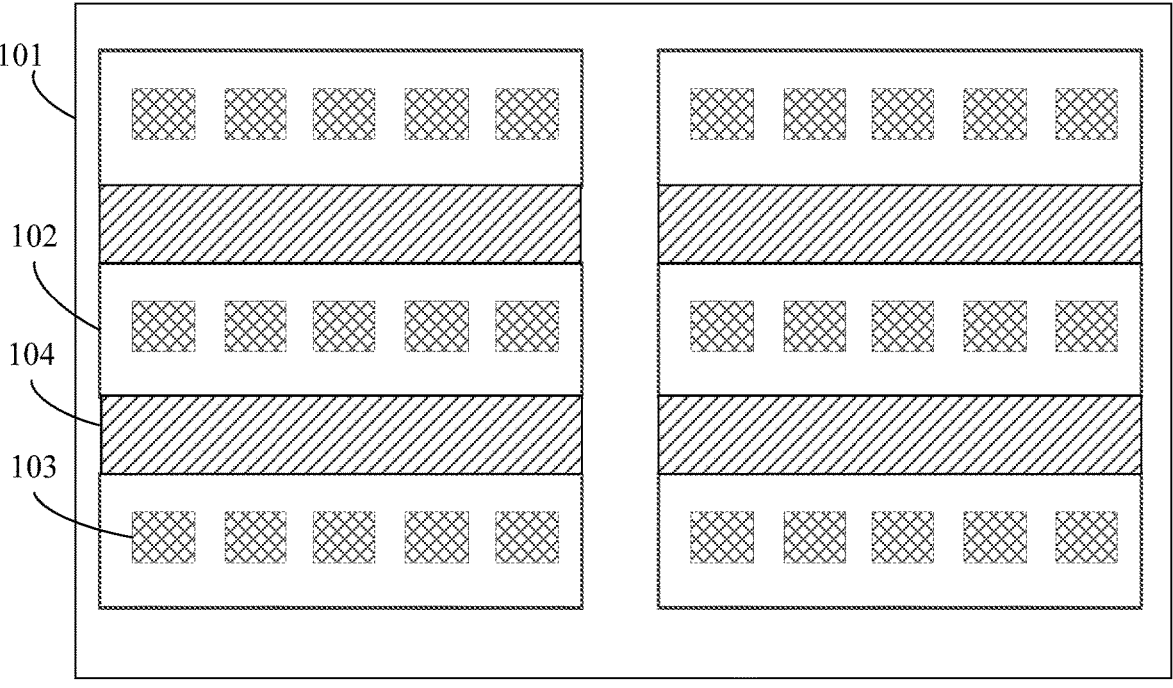
FIG. 1 is a top view of a warehouse to which an embodiment of this application is applicable.

The embodiments of this application may be used in the field of intelligent warehousing technologies. In the field of intelligent warehousing technologies, a material may be stored on a rack in a warehouse, and the material may be individual goods or a container loaded with goods. FIG. 1 is a top view of a warehouse to which an embodiment of this application is applicable. Referring to FIG. 1, six racks 102 are disposed in the warehouse 101. Every two racks 102 are disposed in one row side by side, and a total of such three rows of racks 102 are disposed in the warehouse 101. A material 103 may be placed on the rack 102.

Figure 2:
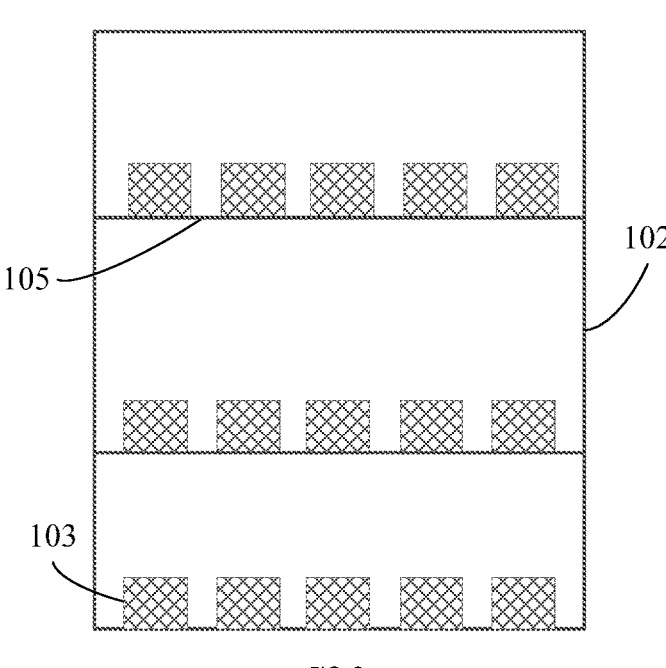
FIG. 2 is a side view of a rack to which an embodiment of this application is applicable.

Definitely, a plurality of goods storage layers may be disposed on the rack 102, each goods storage layer may be provided with a plurality of storage locations, and the material 103 may be placed in each storage location. In this way, the plurality of goods storage layers and the plurality of storage locations increase the storage capacity of the rack 102 for the material 103. In FIG. 1, it may be seen that, each material 103 occupies one storage location. FIG. 2 is a side view of a rack to which an embodiment of this application is applicable. Referring to FIG. 2, a rack 102 includes three goods storage layers 105, each goods storage layer 105 includes five storage locations, and one material 103 may be placed in each storage location.

To increase material transporting efficiency, the material may be usually transported by a robot. The robot may retrieve a material from a goods storage layer on the rack onto a goods storage layer of the robot, or may place a material from a goods storage layer of the robot onto a goods storage layer on the rack.

An unoccupied region is required between every two racks 102 in FIG. 1 and may be referred to as an aisle, to make it convenient for the robot to approach a rack through the aisle. It may be seen that, four aisles 104 exist in FIG. 1. When the robot is required to place a material into a rack 102, the robot may move into a corresponding aisle 104, to place the material on a goods storage layer of the robot into the rack 102. When the robot is required to pick a material from a rack 102, the robot may also move to a corresponding aisle 104, to pick the material from a goods storage layer of the rack 102 and place the material into a goods storage layer of the robot.

FIG. 3 is a schematic structural diagram of a robot according to an embodiment of this application. As shown in FIG. 3, the robot includes a support assembly 210, a movable chassis 220, a goods retrieving and placing apparatus 230, and a storage rack 240. The support assembly 210 is mounted on the movable chassis 220, the storage rack 240 and the goods retrieving and placing apparatus 230 are mounted on the support assembly 210, and the goods retrieving and placing apparatus 230 may move along the support assembly 210 in a vertical direction. Several goods storage layers may be disposed on the storage rack 240, to place one or more materials to be transported. A lifting assembly is disposed on the support assembly 210 and is configured to drive the goods retrieving and placing apparatus 230 to move up and down, so that the goods retrieving and placing apparatus 230 is aligned with any storage unit on the storage rack 240 or aligned with a rack and/or a material in a warehouse. The goods retrieving and placing apparatus 230 can rotate around the vertical direction as an axis to adjust an orientation, to be aligned with the storage unit or aligned with the rack and/or the material. The goods retrieving and placing apparatus 230 is configured to load or unload the material, to transport the material between the rack and the storage unit.

The foregoing material is usually stored in a container. Therefore, when the robot transports the material, the robot transports the container. When a container is bounded out, the robot transports the container from a rack in the warehouse onto a work table, to bound out the container on the work table.

In the related technology, during outbound, a plurality of containers may be continuously bounded out. Specifically, the robot may be assigned to a plurality of containers in order, so that the robot bound outs these containers in order.

However, the foregoing outbound solution is simple, and consequently cannot satisfy an outbound requirement in a complicated service scenario.

To resolve the foregoing problem, based on the embodiments of this application, an outbound requirement in a complicated service scenario may be divided into an outbound sequence and an outbound group, where each outbound sequence includes at least one outbound group, and each outbound group includes at least one outbound container. Therefore, the outbound container may be bounded out through the outbound sequence and the outbound group, and the outbound requirement in the complicated service scenario may be satisfied.

The foregoing complicated service scenario may be a scenario in which a material is divided according to at least two dimensions. For example, the material may be a costume, and the costume may be divided according to such two dimensions as color and size. Therefore, one size may correspond to one outbound group, and the group includes costumes in the size sorted according to colors. Then, outbound groups corresponding to a plurality of sizes may form one outbound sequence. For example, one outbound sequence is obtained in order of a smallest size, a medium size, and a large size. In this way, it may be convenient for a user to store costumes directly according to the outbound sequence, and the costumes are not required to be organized and then stored according to colors and sizes, thereby reducing operating complexity of the user. The user may be usually a costume vendor.

The following describes the technical solutions of the embodiments of this application and how to resolve the foregoing technical problems according to the technical solutions of this application in detail by using specific embodiments. The following specific embodiments may be combined with each other, and the same or similar concepts or processes may not be described in some embodiments. The following describes the embodiments of this application with reference to the accompanying drawings.

FIG. 4 is a flowchart of specific steps of an outbound method according to an embodiment of this application. Referring to FIG. 4, the method may include:

S201: determining at least one outbound sequence, where the outbound sequence includes at least one outbound group, and the outbound group includes at least one outbound container.

The outbound sequence and the outbound group may be determined according to an outbound requirement. In some embodiments, each outbound sequence includes at least one outbound group, and each outbound group includes at least one outbound container.

S202: assigning a transporting task of the outbound container to a robot according to the at least one outbound sequence.

Specifically, for one outbound group, a transporting task of a first outbound container L1 may be first assigned to one robot A, and then transporting tasks of several outbound containers after L1 in the outbound group may be assigned to the robot A according to the number of containers that the robot can transport.

Definitely, when the number of containers assigned to this robot A reaches the number of containers that the robot can be transported, a transporting task of a next outbound container L2 in the group may be assigned to a robot B, and transporting tasks of several outbound containers after L2 in the outbound group are assigned to the robot B, until transporting tasks of outbound containers in the outbound group are all assigned.

A transporting task refers to a task of transporting an outbound container from a rack in a warehouse to a work table, and the work table is configured to bound out the outbound container. One outbound container corresponds to one transporting task, one transporting task is executed by one robot, and one robot may execute one or more transporting tasks.

When at least two outbound sequences exist, transporting tasks between the foregoing different outbound sequences may be assigned in series or in parallel, and the parallel assignment may reduce the time length for assigning the transporting tasks, thereby reducing the outbound time length.

For example, for two outbound sequences Q1 and Q2, Q1 includes two outbound groups G1 and G2, Q2 includes three outbound groups G3, G4, and G5, G1 includes two outbound containers B1 and B2, G2 includes three outbound containers B3, B4, and B5, G3 includes one outbound container B6, G4 includes two outbound containers B7 and B8, and G5 includes four outbound containers B9 to B12.

For the foregoing outbound containers B1 to B12, because B1 to B5 are containers in the outbound sequence Q1, and B6 to B12 are containers in the outbound sequence Q2, transporting tasks may be assigned to B1 to B5 and B6 to B12 in parallel. That is to say, when transporting tasks are assigned to B1 to B5, transporting task may be assigned to B6 to B12.

In addition, each of the foregoing outbound sequences may correspond to one target outbound strategy, where the target outbound strategy may indicate an outbound order of outbound containers in the outbound sequence as any order, and the target outbound strategy may further indicate an outbound order of outbound groups in the outbound sequence, and/or an outbound order of outbound containers in each outbound group.

To ensure the foregoing outbound order, transporting tasks of outbound containers in one outbound sequence are also assigned one by one according to the outbound order, and a transporting task is preferentially assigned to an outbound container that is first bounded out. That is to say, a transporting task of at least one outbound container in each outbound sequence is assigned to the robot according to a target outbound strategy corresponding to each outbound sequence.

For ease of description, an outbound order of outbound groups that is indicated by the target outbound strategy is referred to as a first outbound order, and an outbound order that is of outbound containers in an outbound group and that is indicated by the target outbound strategy is referred to as a second outbound order.

A process of assigning a transporting task according to the target outbound strategy is described below in detail.

When the target outbound strategy indicates the first outbound order and the second outbound order, the transporting task of the at least one outbound container in the outbound sequence may be assigned to the robot according to the first outbound order and the second outbound order.

When a transporting task is assigned to the foregoing outbound sequence according to the first outbound order and the second outbound order, an order of outbound groups in the outbound sequence is first determined according to the first outbound order; then, for each outbound group, an order of outbound containers in the outbound group is determined according to the second outbound order of the outbound groups; then, an order of at least one outbound container in the outbound sequence is determined according to the order of the outbound groups and the order of the outbound containers in each outbound group; and finally, transporting tasks are assigned one by one to the robot according to the order of the at least one outbound container in the outbound sequence.

Usually, a transporting task may be assigned successfully to each outbound container in the outbound sequence according to the first outbound order and the second outbound order. However, because of impact of various factors, a transporting task may be assigned unsuccessfully. For example, an aisle in which one outbound container is located is filled with robots that are performing transporting tasks. Therefore, a transporting task cannot be assigned anymore to the outbound container, and the transporting task is assigned unsuccessfully. In another example, all robots have been assigned or are abnormal. Therefore, no robot may be assigned, and the transporting task is assigned unsuccessfully.

When the target outbound strategy indicates the first outbound order and the second outbound order, that is to say, the outbound requirement indicates an outbound order of outbound groups and an outbound order of outbound containers in an outbound group, in a process of assigning, according to the first outbound order and the second outbound order, the transporting task of each outbound container in the outbound sequence to the robot, if a transporting task of any outbound container in the outbound sequence is assigned unsuccessfully, the transporting task of each outbound container in the outbound sequence is stopped from being assigned to the robot. In this way, when the assignment is unsuccessful, continuing assigning transporting tasks of other outbound containers may be avoided, thereby avoiding inconsistency between an actual outbound order and an outbound order indicated by the target outbound strategy.

Outbound containers that are stopped from being assigned include: outbound containers in a first outbound group in which the outbound containers to which assignment is unsuccessful are located, and outbound containers to which assignment is not performed in an outbound group. For example, for the outbound sequence Q1, the first outbound order is G1 and G2, the second outbound order of G1 is B1 and B2, and the second outbound order of G2 is B3, B4, and B5. If a transporting task is assigned to B2 unsuccessfully, transporting tasks of B3, B4, and B5 are stopped from being assigned to the robot.

When the target outbound strategy indicates the first outbound order but does not indicate the second outbound order, transporting tasks are assigned to outbound groups in the outbound sequence according to the first outbound order, and transporting tasks may be assigned to outbound containers in each outbound group in any order. To avoid omitting an outbound container in an outbound group, one default order may be determined for outbound containers in the outbound group. That is to say, the transporting task of the at least one outbound container in the outbound sequence may be assigned to the robot according to the first outbound order and an intra-group default strategy, where the intra-group default strategy is used for determining, according to information about each outbound container included in the outbound group, an outbound order of the at least one outbound container.

The information about the outbound container includes at least one of the following: a transporting distance of the outbound container, a weight of the outbound container, and a size of the outbound container.

The foregoing transporting distance refers to a distance between a location of the outbound container on a rack and the work table. That is to say, only after the outbound container is transported from the rack to the work table, the robot can perform outbound.

In this embodiment of the present disclosure, a transporting task may be preferentially assigned to an outbound container with a small transporting distance, or a transporting task may be preferentially assigned to an outbound container with a large transporting distance.

For a weight of the foregoing outbound container, a transporting task may be preferentially assigned to an outbound container with a small weight, or a transporting task may be preferentially assigned to an outbound container with a large weight.

For a size of the foregoing outbound container, a transporting task may be preferentially assigned to an outbound container with a small size, or a transporting task may be preferentially assigned to an outbound container with a large size.

Definitely, at least two factors of the transporting distance, the weight, and the size may be further combined to determine an assignment order of transporting tasks of outbound containers in each outbound group. Specifically, one score may be determined for each outbound container according to at least two factors of the transporting distance, the weight, and the size, to perform sorting according to the score to obtain an assignment order of transporting tasks. For example, the score may be obtained by calculation through the following formula:

$$SCR2 = p\_21 \cdot D + p\_22 \cdot H + p\_23 \cdot S \quad (1)$$

where SCR2 is a score of each outbound container, D, H, and S are a transporting distance, a weight, and a size respectively, and p_21, p_22, and p_23 are weighing coefficients of the transporting distance, the weight, and the size respectively.

In actual application, a weighing coefficient in the foregoing formula may be adjusted, to adjust a relationship between the corresponding factor and an assignment order. For example, p_21, p_22, and p_23 may be set to positive numbers, and transporting tasks are assigned to outbound containers in ascending order of SCR2. In this way, a transporting task may be preferentially assigned to an outbound container whose transporting distance, weight, and size are all small.

When a transporting task is assigned to the foregoing outbound sequence according to the first outbound order and the intra-group default strategy, an order of outbound groups in the outbound sequence is first determined according to the first outbound order; then, for each outbound group, an order of outbound containers in the outbound group is determined according to the intra-group default strategy; then, an order of at least one outbound container in the outbound sequence is determined according to the order of the outbound groups and the order of the outbound containers in each outbound group; and finally, transporting tasks are assigned one by one to the robot according to the order of the at least one outbound container in the outbound sequence.

Usually, a transporting task may be assigned successfully to each outbound container in the outbound sequence according to the first outbound order and the intra-group default strategy. However, because of impact of various factors, a transporting task may be assigned unsuccessfully.

When the target outbound strategy indicates the first outbound order but does not indicate the second outbound order, that is to say, the outbound requirement does not indicate an outbound order of outbound containers in an outbound group, in a process of assigning, according to the first outbound order and the intra-group default strategy, the transporting task of the at least one outbound container in the outbound sequence to the robot, if a transporting task of a first outbound container in the outbound sequence is assigned unsuccessfully, outbound may be performed through the following two policies.

In a first strategy, all outbound containers in the outbound sequence are stopped from being assigned to the robot. For example, when outbound containers in one outbound group are required to be bounded out together, this strategy is used.

In a second strategy, a transporting task of an outbound container in an outbound group other than a first outbound group is stopped from being assigned to the robot, and a transporting task of an outbound container in the first outbound group other than the first outbound container is assigned to the robot, where the first outbound group is an outbound group in which the first outbound container is located. For example, when outbound containers in one outbound group are not required to be bounded out together, this strategy is used.

The stopping assigning the outbound container in the outbound group other than the first outbound group to the robot may avoid inconsistency between an actual outbound order of the outbound groups and an outbound order indicated by the target outbound strategy, and the assigning the outbound container in the first outbound group other than the first outbound container to the robot may increase an assignment success rate of transporting tasks.

For example, for the outbound sequence Q1, the first outbound order is G1 and G2, it is determined according to the intra-group default strategy that the second outbound order of G1 is B2 and B1, and it is determined according to the intra-group default strategy that the second outbound order of G2 is B4, B3, and B5. If a transporting task is assigned to B2 unsuccessfully, transporting tasks of B4, B3, and B5 in G2 are stopped from being assigned to the robot, and a transporting task of B1 in G1 continues to be assigned.

When the target outbound strategy indicates the second outbound order but does not indicate the first outbound order, transporting tasks may be assigned through two policies.

In a first strategy, transporting tasks may be assigned to outbound groups in the outbound sequence in any order, and transporting tasks may be assigned to outbound containers in each outbound group according to the second outbound order. To avoid omitting an outbound group, one default order may be determined for the outbound groups. That is to say, the transporting task of the at least one outbound container in the outbound sequence may be assigned to the robot according to an inter-group default strategy and the second outbound order, where the inter-group default strategy is used for determining, according to information about each outbound group included in the outbound sequence, an outbound order of the at least one outbound group.

The information about the outbound group includes at least one of the following: the number of the outbound containers included in the outbound groups, and the number of aisles in which the outbound containers included in the outbound groups are located.

For the number of the outbound containers, a transporting task may be preferentially assigned to an outbound group in which the number is small, or a transporting task may be preferentially assigned to an outbound group in which the number is large.

For the number of aisles in which the outbound containers are located, a transporting task may be preferentially assigned to an outbound group in which the number of aisles is small, or a transporting task may be preferentially assigned to an outbound group in which the number of aisles is large.

Definitely, the number of outbound containers and the number of aisles may be further combined to determine an assignment order of transporting tasks of outbound groups. Specifically, one score may be determined for each outbound group according to the number of outbound containers and the number of aisles, to perform sorting according to the score to obtain an assignment order of transporting tasks. For example, the score may be obtained by calculation through the following formula:

$$SCR1 = p\_11 \cdot \lfloor NUM \rfloor\_1 + p\_12 \cdot \lfloor NUM \rfloor\_2)$$

where SCR1 is a score of each outbound group, $\lfloor NUM \rfloor\_1$ and $\rfloor NUM \lfloor\_2$ are the number of outbound containers and the number of aisles respectively, and p_11 and p_12 are weighing coefficients of the number of outbound containers and the number of aisles respectively.

In actual application, a weighing coefficient in the foregoing formula may be adjusted, to adjust a relationship between the corresponding factor and an assignment order. For example, p_11 and p_12 may be set to positive numbers, and transporting tasks are assigned to outbound groups in ascending order of SCR1. In this way, a transporting task may be preferentially assigned to an outbound group in which the number of outbound containers and the number of aisles are both small.

When a transporting task is assigned to the foregoing outbound sequence according to the second outbound order and the inter-group default strategy, an order of outbound groups in the outbound sequence is first determined according to the inter-group default strategy; then, for each outbound group, an order of outbound containers in the outbound group is determined according to the second outbound order of the outbound groups; then, an order of at least one outbound container in the outbound sequence is determined according to the order of the outbound groups and the order of the outbound containers in each outbound group; and finally, transporting tasks are assigned one by one according to the order of the at least one outbound container in the outbound sequence.

Usually, a transporting task may be assigned successfully to each outbound container in the outbound sequence according to the second outbound order and the inter-group default strategy. However, because of impact of various factors, a transporting task may be assigned unsuccessfully.

In a second strategy, outbound containers of a plurality of outbound groups may be alternately assigned while ensuring the second outbound order. For example, assuming that the outbound sequence Q1 includes two outbound groups G1 and G2, G1 includes two outbound containers B1 and B2, and G2 includes three outbound containers B3, B4 and B5, transporting tasks may be assigned in the following order: B1, B3, B4, B2, and B5.

The foregoing alternate assignment may be understood as inserting an outbound container in one outbound group G1 before or after an outbound container that is associated with the outbound container and that is in another outbound group, to assign a transporting task. Two associated outbound containers may include at least one of the following: two outbound containers in close storage locations on a rack, and two outbound containers in the same type.

When the target outbound strategy indicates the second outbound order but does not indicate the first outbound order, that is to say, the outbound requirement does not indicate an outbound order of outbound groups, in a process of assigning, according to the inter-group default strategy and the second outbound order, the transporting task of the at least one outbound container in the outbound sequence to the robot, if a transporting task of a first outbound container in the outbound sequence is assigned unsuccessfully, transporting tasks of other outbound containers in a first outbound group in which the first outbound container is located are stopped from being assigned to the robot, and a transporting task of each outbound container in a second outbound group is assigned to the robot, where the second outbound group is an outbound group in the outbound sequence other than the first outbound group.

The stopping assigning the transporting tasks of the other outbound containers in the first outbound group in which the first outbound container is located to the robot may avoid inconsistency between an actual outbound order of outbound containers in the outbound group and an order indicated by the target outbound strategy. In addition, the assigning the transporting task of each outbound container in the second outbound group to the robot may increase an assignment success rate of transporting tasks.

For example, for the outbound sequence Q1, an outbound order determined according to the inter-group default strategy is G2 and G1, the second outbound order of G1 is B1 and B2, and the second outbound order of G2 is B3, B4, and B5. If a transporting task is assigned to B1 unsuccessfully, a transporting task of B2 in G1 is stopped from being assigned to the robot, but transporting tasks of B3, B4, and B5 in G2 are assigned to the robot.

When the target outbound strategy does not indicate the first outbound order and the second outbound order, transporting tasks may be assigned through two policies.

In a first strategy, for all outbound containers in the outbound sequence, an assignment order of transporting tasks of all the outbound containers in the outbound sequence may be determined according to a distance between two outbound containers, a priority of each outbound container, and an aisle in which each outbound container is located, to assign the transporting tasks. For example, transporting tasks are continuously assigned to outbound containers between which a distance is short, or transporting tasks are assigned to outbound containers one by one in order of priorities, or transporting tasks are continuously assigned to outbound containers on racks in the same aisle.

In a second strategy, a transporting task may be assigned to at least one outbound container in the outbound sequence in any order. In this embodiment of the present disclosure, to avoid omitting an outbound container when a transporting task is assigned, the transporting task of the at least one outbound container in the outbound sequence may be assigned to the robot according to the inter-group default strategy and the intra-group default strategy.

It may be understood that according to the inter-group default strategy and the intra-group default strategy, one default outbound order is determined for at least one outbound container, to assign a transporting task to the at least one outbound container according to the default outbound order.

In addition, when the target outbound strategy does not indicate the first outbound order and the second outbound order, that is to say, the outbound requirement does not indicate an outbound order of outbound groups and an outbound order of outbound containers in an outbound group, in a process of assigning, according to the inter-group default strategy and the intra-group default strategy, the transporting task of the at least one outbound container in the outbound sequence to the robot, if a transporting task of one outbound container is assigned unsuccessfully, outbound may be performed through the following two policies.

In a first strategy, transporting tasks of other outbound containers in a first outbound group may be stopped from being assigned to the robot, and transporting tasks of outbound containers in other outbound groups are assigned to the robot. The first outbound group is an outbound group in which outbound containers to which assignment is unsuccessful are located.

In a second strategy, transporting tasks of other outbound containers in the outbound sequence to which no transporting task is assigned may continue to be assigned, where the transporting tasks include transporting tasks of the following outbound containers: other outbound containers in a first outbound group and outbound containers in other outbound groups. In this way, an assignment success rate of transporting tasks may be increased.

For example, the outbound sequence Q1 includes outbound groups G1 and G2, G1 includes outbound containers B1 and B2, and G2 includes outbound containers B3, B4, and B5. Because the first outbound order and the second outbound order do not exist, an outbound order may be determined according to the inter-group default strategy and the intra-group default strategy, to obtain: B5, B4, B3, B1, and B2. If a transporting task is assigned to B4 unsuccessfully, transporting tasks of B3, B1, and B2 continue to be assigned to the robot.

In addition, to further increase an assignment success rate of transporting tasks, each time a transporting task is assigned to one outbound sequence, outbound containers assigned unsuccessfully previously may be assigned again.

S203: carrying out the outbound operation of the at least one outbound container according to a task execution state of the transporting task and the at least one outbound sequence.

The task execution state may include a plurality of states, for example, a state in which the robot walks, a state in which the robot picks out an outbound container, and a state in which the robot reaches the work table. The state in which the robot walks may include a state of walking when no container is picked out, and a state of walking when a container is picked out, and the reaching the work table indicates that the robot has transported an outbound container into a preset range around the work table.

In this embodiment of the present disclosure, any outbound container is referred to as a second outbound container. An outbound group in which the second outbound container is located is referred to as a second outbound group. An outbound container that is in the first outbound order and that is included in a third outbound group located before the second outbound group and/or an outbound container that is in the second outbound order corresponding to the second outbound group and that is located before the second outbound container is referred to as a third outbound container.

Therefore, when a task execution state of a transporting task of the second outbound container is that the second outbound container is picked out, it is required to determine, according to a task execution state of a transporting task of the third outbound container, that the robot of the second outbound container waits or continues to execute the transporting task of the second outbound container, to ensure that the second outbound container is bounded out after the third outbound container.

Optionally, a task execution state of a transporting task of the third outbound container may be obtained when the robot picks out the second outbound container, to determine that the robot of the second outbound container waits or continues to execute the transporting task of the second outbound container. The state of picking out the second outbound container may include a time range between the picking out the second outbound container and the reaching the work table.

Specifically, a process of outbound the second outbound container may include: first, obtaining a task execution state of at least one third transporting task, where the third transporting task is a transporting task of the third outbound container; and then, if the task execution state of each third transporting task is that a work table is reached, continuing to execute the second transporting task, to bound out the second outbound container and the third outbound container according to the first outbound order and/or the second outbound order.

Definitely, if the task execution state of the at least one third transporting task is any execution state before that the work table is reached, the robot transporting the second outbound container is controlled to wait; and when the task execution state of the third transporting task is updated to that the work table is reached, the second transporting task continues to be executed, to bound out the second outbound container and the third outbound container according to the first outbound order and/or the second outbound order.

It may be understood that the outbound order determined according to the first outbound order and/or the second outbound order is that the third outbound container is located before the second outbound container. Therefore, the third outbound container is first bounded out, and then the second outbound container is bounded out.

Figure 5:
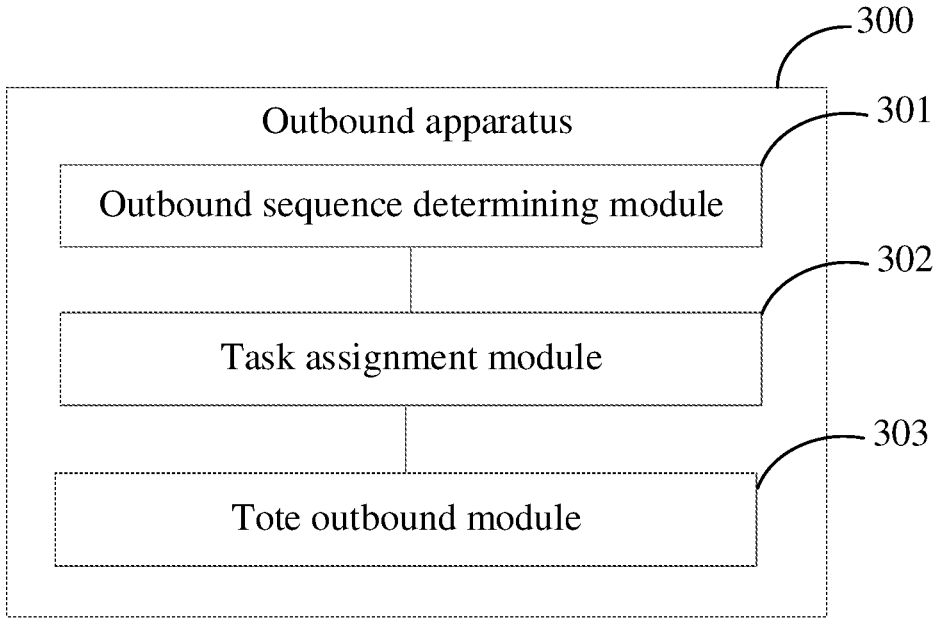
FIG. 5 is a structural block diagram of an outbound apparatus according to an embodiment of this application.

Corresponding to the outbound method of the foregoing embodiments, FIG. 5 is a structural block diagram of an outbound apparatus according to an embodiment of this application. For ease of description, only parts related to the embodiments of this application are shown. Referring to FIG. 5, the foregoing outbound apparatus 300 includes: an outbound sequence determining module 301, a task assignment module 302, and a container outbound module 303.

The outbound sequence determining module 301 is configured to determine at least one outbound sequence, where each outbound sequence includes at least one outbound group, and each outbound group includes at least one outbound container.

The task assignment module 302 is configured to assign a transporting task of the outbound container to a robot according to the at least one outbound sequence.

The container outbound module 303 is configured to bound out the at least one outbound container according to a task execution state of the transporting task and the at least one outbound sequence.

Optionally, when at least two outbound sequences exist, the task assignment module 302 is further configured to: assign transporting tasks of the at least two outbound sequences to the robot in parallel, and assign, according to a target outbound strategy corresponding to each outbound sequence, a transporting task of at least one outbound container in each outbound sequence to the robot, where the target outbound strategy is used for indicating a first outbound order of the at least one outbound group included in the outbound sequence, and/or a second outbound order of the at least one outbound container included in each outbound group.

Optionally, the task assignment module 302 is further configured to: when assigning, according to the target outbound strategy corresponding to each outbound sequence, the transporting task of the at least one outbound container in each outbound sequence to the robot, assign, according to the first outbound order and the second outbound order, the transporting task of the at least one outbound container in the outbound sequence to the robot; or assign, according to the first outbound order and an intra-group default strategy, the transporting task of the at least one outbound container in the outbound sequence to the robot, where the intra-group default strategy is used for determining, according to information about each outbound container included in the outbound group, an outbound order of the at least one outbound container; or assign, according to an inter-group default strategy and the second outbound order, the transporting task of the at least one outbound container in the outbound sequence to the robot, where the inter-group default strategy is used for determining, according to information about each outbound group included in the outbound sequence, an outbound order of the at least one outbound group; or assign, according to the inter-group default strategy and the intra-group default strategy, the transporting task of the at least one outbound container in the outbound sequence to the robot.

Optionally, the information about the outbound group includes at least one of the following: the number of the outbound containers included in the outbound groups, and the number of aisles in which the outbound containers included in the outbound groups are located.

Optionally, the information about the outbound container includes at least one of the following: a transporting distance of the outbound container, a weight of the outbound container, and a size of the outbound container.

Optionally, the task assignment module 302 is further configured to: when assigning, according to the first outbound order and the second outbound order, the transporting task of the at least one outbound container in the outbound sequence to the robot, if a transporting task of any outbound container in the outbound sequence is assigned unsuccessfully, stop assigning the transporting task of each outbound container in the outbound sequence to the robot.

Optionally, the task assignment module 302 is further configured to: when assigning, according to the inter-group default strategy and the second outbound order, the transporting task of the at least one outbound container in the outbound sequence to the robot, if a transporting task of a first outbound container in the outbound sequence is assigned unsuccessfully, stop assigning transporting tasks of other outbound containers in a first outbound group in which the first outbound container is located to the robot, and assign a transporting task of each outbound container in a second outbound group to the robot, where the second outbound group is an outbound group in the outbound sequence other than the first outbound group.

Optionally, the task assignment module 302 is further configured to: when assigning, according to the first outbound order and the intra-group default strategy, the transporting task of the at least one outbound container in the outbound sequence to the robot, if a transporting task of a first outbound container in the outbound sequence is assigned unsuccessfully, stop assigning a transporting task of an outbound container in an outbound group other than a first outbound group to the robot, and assign a transporting task of an outbound container in the first outbound group other than the first outbound container to the robot, where the first outbound group is an outbound group in which the first outbound container is located.

Optionally, the container outbound module 303 is further configured to: when a task execution state of a second transporting task corresponding to one second outbound container is that the second outbound container is picked out, obtain a task execution state of at least one third transporting task, where the third transporting task is a transporting task of a third outbound container, the third outbound container includes an outbound container that is in the first outbound order and that is included in a third outbound group located before a second outbound group and/or an outbound container that is in the second outbound order corresponding to the second outbound group and that is located before the second outbound container, and the second outbound group is an outbound group in which the second outbound container is located; and if the task execution state of each third transporting task is that a work table is reached, continue to execute the second transporting task, to bound out the second outbound container and the third outbound container according to the first outbound order and/or the second outbound order.

Optionally, the container outbound module 303 is further configured to: if the task execution state of the at least one third transporting task is any execution state before that the work table is reached, control the robot transporting the second outbound container to wait; and when the task execution state of the third transporting task is updated to that the work table is reached, continue to execute the second transporting task, to bound out the second outbound container and the third outbound container according to the first outbound order and/or the second outbound order.

The outbound apparatus provided in this embodiment may be configured to execute the technical solution in the method embodiment shown in FIG. 4. The implementation principles and technical effects thereof are similar. Details are not described in this embodiment again.

Figure 6:
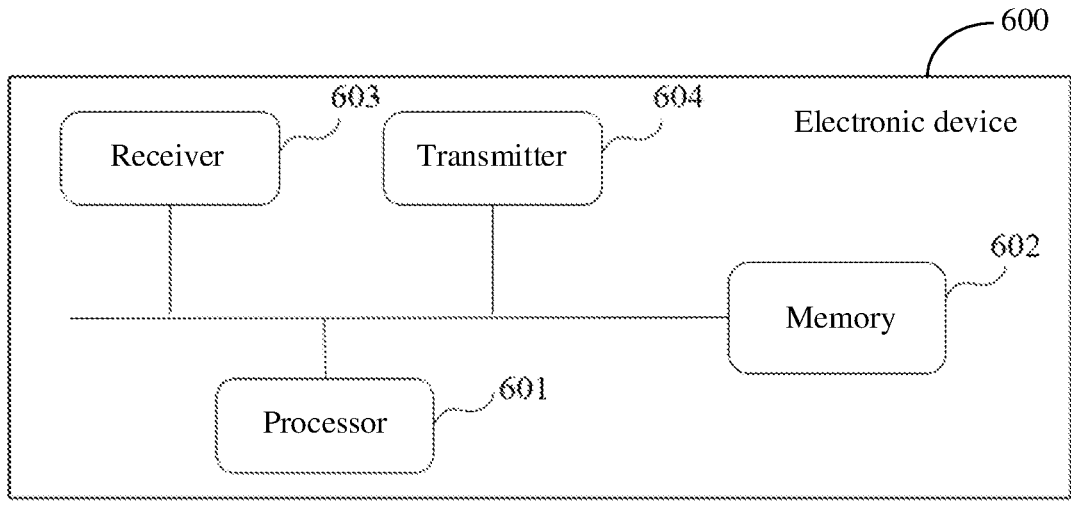
FIG. 6 is a structural block diagram of an electronic device according to an embodiment of this application.

FIG. 6 is a structural block diagram of an electronic device according to an embodiment of this application. The electronic device 600 includes a memory 602 and at least one processor 601.

The memory 602 stores computer-executable instructions; and the at least one processor 601 executes the computer-executable instructions stored in the memory 602, to enable the electronic device 601 to perform the method in FIG. 4.

In addition, the electronic device may further include a receiver 603 and a transmitter 604, the receiver 603 is configured to receive information from another apparatus or device and forward the information to the processor 601, and the transmitter 604 is configured to send information to another apparatus or device.

An embodiment of this application further provides a computer-readable storage medium, where the computer-readable storage medium stores computer-executable instructions, and when a processor executes the computer-executable instructions, a computing device is enabled to perform the method in FIG. 4.

An embodiment of this application further provides a computer program, where the computer program is used for performing the method in FIG. 4.

Finally, it should be noted that the foregoing embodiments are merely used for describing the technical solutions of this application, but are not intended to limit this application. It should be understood by a person of ordinary skill in the art that although this application has been described in detail with reference to the above embodiments, modifications may be made to the technical solutions described in the above embodiments, or equivalent replacements may be made to some or all technical features in the technical solutions, as long as such modifications or replacements do not cause the essence of corresponding technical solutions to depart from the scope of the technical solutions of the embodiments of this application.

The invention claimed is:

1. An outbound method, comprising:

determining at least one outbound sequence, wherein an outbound sequence of the at least one outbound sequence is an arrangement of a plurality of outbound containers, the plurality of outbound containers are grouped into one or more outbound groups, and each outbound group comprises at least one outbound container;

assigning, according to a target outbound strategy corresponding to the outbound sequence, a transporting task of the plurality of outbound containers in the at least one outbound sequence to a robot, wherein the target outbound strategy is used for indicating at least one of: a first outbound order of the at least one outbound group in the outbound sequence, and a second outbound order of the at least one outbound container in the at least one outbound group, the first outbound order indicates which outbound group in an outbound sequence is assigned first, and which outbound group in the outbound sequence follows, the second outbound order indicates which outbound container in an outbound group is assigned first, and which outbound container in the outbound group follows; and controlling, according to a task execution state of the transporting task and the target outbound strategy, the robot to transport the plurality of outbound containers in the at least one outbound sequence, so as to complete outbound operation of the at least one outbound sequence;

wherein the assigning, according to the target outbound strategy corresponding to the outbound sequence, the transporting task of the plurality of outbound containers in the at least one outbound sequence to the robot comprises:

assigning, according to the first outbound order and the second outbound order, the transporting task of the plurality of outbound containers in the at least one outbound sequence to the robot; or assigning, according to the first outbound order and an intra-group default strategy, the transporting task of the plurality of outbound containers in the at least one outbound sequence-to the robot, wherein the intra-group default strategy is used for determining, according to information about each outbound container in the outbound group, an outbound order of the at least one outbound container; or assigning, according to an inter-group default strategy and the second outbound order, the transporting task of the plurality of outbound containers in the at least one outbound sequence to the robot, wherein the inter-group default strategy is used for determining, according to information about each outbound group in the outbound sequence, an outbound order of the at least one outbound group; or assigning, according to the inter-group default strategy and the intra-group default strategy, the transporting task of the plurality of outbound containers in the at least one outbound sequence to the robot;

wherein the assigning, according to the inter-group default strategy and the second outbound order, the transporting task of the plurality of outbound containers in the at least one outbound sequence to the robot comprises:

in a process of assigning the transporting task of each outbound container in the at least one outbound sequence to the robot, when a transporting task of a first outbound container in a first outbound group in an outbound sequence of the at least one outbound sequence is assigned unsuccessfully, stopping assigning transporting tasks of other outbound containers in the first outbound group to the robot, and assigning a transporting task of each outbound container in a second outbound group to the robot, wherein the second outbound group is an outbound group in the outbound sequence other than the first outbound group.

2. The method according to claim 1, wherein the determining the at least one outbound sequence comprises:

determining at least two outbound sequences;

wherein the assigning, according to a target outbound strategy corresponding to the outbound sequence, a transporting task of the plurality of outbound containers in the at least one outbound sequence to a robot comprises:

assigning transporting tasks of the at least two outbound sequences to the robot in parallel, and assigning, according to a target outbound strategy corresponding to each outbound sequence, a transporting task of the plurality of outbound containers in each outbound sequence to the robot.

3. The method according to claim 1, wherein the information about the outbound group comprises at least one of: the number of the outbound containers in the outbound group, and the number of aisles in which the outbound containers in the outbound group are located.

4. The method according to claim 1, wherein the information about the outbound container comprises at least one of: a transporting distance of the outbound container, a weight of the outbound container, and a size of the outbound container.

5. The method according to claim 1, wherein the assigning, according to the first outbound order and the second outbound order, the transporting task of the plurality of outbound containers in the at least one outbound sequence to the robot comprises:

in a process of assigning, according to the first outbound order and the second outbound order, the transporting task of each outbound container in the at least one outbound sequence to the robot, when a transporting task of any outbound container in the at least one outbound sequence is assigned unsuccessfully, stopping assigning the transporting task of each outbound container in the at least one outbound sequence to the robot.

6. The method according to claim 1, wherein the assigning, according to the first outbound order and the intra-group default strategy, the transporting task of the plurality of outbound containers in the at least one outbound sequence to the robot comprises:

in a process of assigning the transporting task of each outbound container in the outbound sequence to the robot, when a transporting task of a first outbound container in a first outbound group in an outbound sequence of the at least one outbound sequence is assigned unsuccessfully, stopping assigning a transporting task of an outbound container in an outbound group other than the first outbound group to the robot, and assigning a transporting task of an outbound container in the first outbound group other than the first outbound container to the robot.

7. The method according to claim 1, wherein the controlling, according to the task execution state of the transporting task and the target outbound strategy, the robot to transport the plurality of outbound containers in the at least one outbound sequence comprises:

when a task execution state of a second transporting task corresponding to a second outbound container is that the second outbound container is retrieved, obtaining a task execution state of at least one third transporting task, wherein the third transporting task is a transporting task of a third outbound container, the third outbound container comprises at least one of: an outbound container that is in the first outbound order and that is in a third outbound group located before a second outbound group, and, an outbound container that is in the second outbound order corresponding to the second outbound group and that is located before the second outbound container, wherein the second outbound group is an outbound group comprising the second outbound container; and when the task execution state of each third transporting task is that a work table is reached, continuing to execute the second transporting task, to carry out the outbound operation of the second outbound container and the third outbound container according to at least one of the first outbound order and the second outbound order.

8. The method according to claim 7, further comprises:

when the task execution state of the at least one third transporting task is any execution state before that the work table is reached, controlling the robot transporting the second outbound container to wait; and when the task execution state of the at least one third transporting task is updated to that the work table is reached, continuing to execute the second transporting task, to carry out the outbound operation of the second outbound container and the third outbound container according to at least one of the first outbound order and the second outbound order.

9. An electronic device, comprising:

a memory configured to store computer-executable instructions; and at least one processor configured to execute the computer-executable instructions stored in the memory, wherein when the computer-executable instructions are executed by the processor, the processor is configured to:

obtain an outbound sequence, wherein the outbound sequence is an arrangement of a plurality of outbound containers, the plurality of outbound containers are grouped into one or more outbound groups, and each outbound group comprises one or more outbound container;

determine a first outbound order of the one or more outbound group, and determining a second outbound order of the one or more outbound container in the outbound group, wherein the first outbound order indicates which outbound group in an outbound sequence is assigned first, and which outbound group in the outbound sequence follows, the second outbound order indicates which outbound container in an outbound group is assigned first, and which outbound container in the outbound group follows;

assign a transporting task of the plurality of outbound containers in the outbound sequence to a robot according to at least one of the first outbound order and the second outbound order; and control, according to a task execution state of the transporting task, the robot to transport the plurality of outbound containers in the outbound sequence based on the at least one of the first outbound order and the second outbound order;

wherein the processor is further configured to:

assign a transporting task of the plurality of outbound containers in the outbound sequence to a robot according to the first outbound order and the second outbound order; or assign a transporting task of the plurality of outbound containers in the outbound sequence to a robot according to the first outbound order and an intra-group default order, wherein the intra-group default order is determined by information about the outbound container in the outbound group; or assign a transporting task of the plurality of outbound containers in the outbound sequence to a robot according to an inter-group default order and the second outbound order, wherein the inter-group default order is determined by information about the outbound group in the outbound sequence;

wherein the processor is further configured to:

stop, when a transporting task of a first outbound container in the outbound sequence is assigned unsuccessfully, assigning a transporting task of an outbound container in an outbound group other than a first outbound group to the robot, in a process of assigning the transporting task of each outbound container in the outbound sequence to a robot according to the first outbound order and the intra-group order; and assign a transporting task of an outbound container in the first outbound group other than the first outbound container to the robot, wherein the first outbound group comprises the first outbound container.

10. The electronic device according to claim 9, wherein the processor is configured to:

stop, when a transporting task of any outbound container in the outbound sequence is assigned unsuccessfully, assigning the transporting task of each outbound container in the outbound sequence to the robot, in a process of assigning the transporting task of each outbound container in the outbound sequence to a robot according to the first outbound order and the second outbound order.

11. The electronic device according to claim 9, wherein the processor is configured to:

stop, when a transporting task of a first outbound container in the outbound sequence is assigned unsuccessfully, assigning transporting tasks of other outbound containers in a first outbound group comprising the first outbound container, in a process of assigning the transporting task of each outbound container in the outbound sequence to a robot according to the inter-group default order and the second outbound order; and assign a transporting task of each outbound container in a second outbound group to the robot, wherein the second outbound group is an outbound group in the outbound sequence other than the first outbound group.

12. The electronic device according to claim 9, wherein the processor is configured to:

obtain, when a task execution state of a second transporting task corresponding to a second outbound container is that the second outbound container is retrieved, a task execution state of a third transporting task of a third outbound container, wherein the third outbound container is in the first outbound order and is in a third outbound group located before a second outbound group, and/or, the third outbound container is in the second outbound order corresponding to the second outbound group and is located before the second outbound container, wherein the second outbound group comprises the second outbound container; and continue, when the task execution state of each third transporting task is that a work table is reached, to execute the second transporting task.

13. A non-transitory computer-readable storage medium, wherein the computer-readable storage medium stores computer-executable instructions, and when a processor executes the computer-executable instructions, a computer is enabled to:

obtain an outbound sequence, wherein the outbound sequence is an arrangement of a plurality of outbound containers, the plurality of outbound containers are grouped into one or more outbound groups and each outbound group comprises one or more outbound container;

determine a first outbound order of the one or more outbound group, and determining a second outbound order of the one or more outbound container in the outbound group, wherein the first outbound order indicates which outbound group in an outbound sequence is assigned first, and which outbound group in the outbound sequence follows, the second outbound order indicates which outbound container in an outbound group is assigned first, and which outbound container in the outbound group follows;

assign a transporting task of the plurality of outbound containers in the outbound sequence to a robot according to an order strategy, wherein the order strategy comprises: the first outbound order and the second outbound order, the first outbound order and an intra-group default order, an inter-group default order and the second outbound order, or the inter-group default order and the intra-group default order, wherein the intra-group default order is determined by information about the outbound container in the outbound group, the inter-group default order is determined by information about the outbound group in the outbound sequence; and control, according to a task execution state of the transporting task, the robot to transport the plurality of outbound containers in the outbound sequence based on the order strategy;

wherein computer is further enabled to:

stop, when a transporting task of a first outbound container in the outbound sequence is assigned unsuccessfully, assigning transporting tasks of other outbound containers in a first outbound group comprising the first outbound container, in a process of assigning the transporting task of each outbound container in the outbound sequence to a robot according to the inter-group default order and the second outbound order, and assign a transporting task of each outbound container in a second outbound group to the robot, wherein the second outbound group is an outbound group in the outbound sequence other than the first outbound group; or stop, when a transporting task of a first outbound container in the outbound sequence is assigned unsuccessfully, assign a transporting task of an outbound container in an outbound group other than a first outbound group to the robot, in a process of assigning the transporting task of each outbound container in the outbound sequence to a robot according to the first outbound order and the intra-group order, and assign a transporting task of an outbound container in the first outbound group other than the first outbound container to the robot, wherein the first outbound group comprises the first outbound container.

14. The non-transitory computer-readable storage medium according to claim 13, wherein computer is enabled to:

obtain, when a task execution state of a second transporting task corresponding to a second outbound container is that the second outbound container is retrieved, a task execution state of a third transporting task of a third outbound container, wherein the third outbound container is in the first outbound order and is in a third outbound group located before a second outbound group, and/or, the third outbound container is in the second outbound order corresponding to the second outbound group and is located before the second outbound container, wherein the second outbound group comprises the second outbound container; and continue, when the task execution state of each third transporting task is that a work table is reached, to execute the second transporting task.

15. The non-transitory computer-readable storage medium according to claim 14, wherein computer is enabled to:

control, when the task execution state of the third transporting task is any execution state before that the work table is reached, the robot transporting the second outbound container to wait; and continue, when the task execution state of the third transporting task is updated to that the work table is reached, to execute the second transporting task.

* * * * *